Patented Mar. 9, 1948

2,437,666

UNITED STATES PATENT OFFICE 2,437,666

MINERAL FEED FOR ANIMALS AND METHOD OF PRODUCING SAME

George B. Smith, Maple Park, Ill., assignor to Roberta Jane Baxter, Crystal Lake, and Marjorie Lou Smith, Evanston, Ill.

No Drawing. Application January 15, 1945, Serial No. 572,976

5 Claims. (Cl. 99—2)

It is common practice to feed certain minerals to animals to supply minerals or mineral compounds in which the animals would otherwise be deficient. Two such minerals extensively fed to animals are ground iron oxide ore and sulphur. At times these minerals have been used as an admixture with other feeds as a supplement thereto and on occasion the minerals have been fed alone.

A typical iron analysis of iron ore ground for feed purposes in accordance with prior practice is as follows:

Iron calculated as iron oxide:

| | |
|---|---|
| $Fe_2O_3$ | 85.920 |
| Phosphorus | .099 |
| Silica | 7.10 |
| Manganese | .25 |
| Alumina | 2.89 |
| Lime | 1.20 |
| Magnesium | .43 |
| Sulphur | .011 |
| Loss by ignition | 2.20 |

The raw iron ore is usually ground to the order of 200 mesh and is then in the form of a hard heavy compact material and is not readily soluble in the fluids which are present in the digestive tract of the animal. Very little, if any, is soluble in water and only small amounts even in concentrated hydrochloric acid. Of course, lesser amounts are soluble in the relatively dilute hydrochloric acid content present in the digestive tract of animals. As a result of the foregoing it has been necessary to feed relatively large amounts of the ground iron ore in order to enable the animal to assimilate even small amounts of iron.

Sulphur heretofore used as mineral feed for animals has been in the form of free sulphur ground to a relatively fine state. Such sulphur is only slightly soluble over long periods in the animal digestive tract. Hence as in the case of the ground iron oxide ore, relatively large amounts of such sulphur must be supplied to the animal in order that the desired amount may be assimilated by the animal.

One of the objects of my invention is to provide an iron oxide compound as a mineral feed for animals of such composition that it will be better assimilated by the animal to which it is supplied.

Another object of my invention is to provide a compound of iron oxide and sulphur whereby both iron and sulphur may be supplied to an animal for feed purposes in such form that the iron and sulphur will be assimilated to a much greater extent than has been the case when iron oxide and sulphur have been supplied in accordance with prior practice.

Again it is an object of my invention to provide an iron oxide compound better adapted as a mineral for animal feeds and which can be made available at lower cost.

A still further object of the invention is to provide an iron oxide sulphur compound which can be utilized for animal feed purposes for supplying both the iron and sulphur in forms better adapted for assimilation by the animal and which can be produced at low cost.

Other objects of the invention relate to the methods of producing the foregoing iron oxide and iron oxide-sulphur compounds.

Additional objects and advantages will appear as I proceed with the specification.

The improved iron oxide compounds may be produced by a number of processes which will be clear from a statement of illustrative processes to follow.

Iron ores or natural occurring iron compounds containing sulphur and/or sulphur compounds and/or metals, can be used in the manufacture of my iron bearing material for feed purposes. Such ores and compounds of materials can also be used to manufacture iron bearing material containing, by design, a predetermined amount of sulphur or sulphur compounds.

Massive ores such as iron pyrites, iron ores containing mixtures, without limitation, of copper, iron, zinc, silver and gold, alumina and other metallic and non-metallic materials, are first crushed and then screened to a predetermined fineness of approximately 90 per cent through 100 mesh. It is not necessary to grind to this specific fineness as the material can be coarser or finer, but this is the preferred size. The mass of screened material is now ready for roasting or calcination. The prepared raw material is charged into a muffle, reverberatory or rotary furnace at a furnace temperature of from 800 degrees F. to 1500 or 1800 degrees F. depending upon the material which is being roasted and depending upon the melting or fusion point of the raw material being used. In all cases it is necessary to roast at a temperature below the fusion point of the raw material mass. The higher temperatures cause the sulphur to be released in greater volume and more rapidly than at lower temperatures.

In the case where ordinary iron pyrites are used as a raw material all that is necessary is to follow the procedure as outlined in the foregoing paragraph and dead burn the material by driving out all of the sulphur when producing purely an iron bearing compound. When it is desired to leave a predetermined amount of sulphur to produce an iron sulphur bearing compound, instead of dead burning the mass is discharged from the furnace when control methods indicate that the desired predetermined amount of sulphur remains in the compound.

In the case of using a more complicated ore or mass of material containing, for instance and without limitation to the materials about to be mentioned, namely: copper, zinc, sulphur, gold and silver and iron, it is economical and practicable to extract the copper, zinc and other metals and prepare them for sale to the general trade. Then, as a final step, the sulphur and iron, which are the main materials left, are treated exactly like ordinary iron pyrites and according to the method stated in the previous paragraph for the production of iron easily assimilated or dissolved in hydrochloric acid or according to the method of producing an iron-sulphur compound containing a predetermined amount of sulphur, when that is desired.

After the material is of the proper quality and the desired percentages of iron and sulphur remain, the material is discharged from the furnace. The product is then prepared by screen to eliminate any large lumps that have formed and to eliminate foreign materials not desirable in the finished product. After screening the material is loaded into suitable containers such as bags, kegs, barrels, etc. and it is then ready for sale to the feed manufacturer or to the consumer of feed ingredients and materials. If desired, the material discharged from the furnace may be ground and/or air separated to mesh fineness as small as from 300 to 500 mesh, but this is ordinarily not necessary.

While it is not necessary to select a starting material of extremely high iron content (say 65% or higher) the product is much more desirable as a mineral feed for animals if it does contain a high iron content. Also, when the iron content is high the available iron in the compound is of greater ratio to the amount of the retained sulphur which is desirable in a mineral feed for animals. As the sulphur content in ferriferous materials often runs anywhere from 5 to 40 per cent, there is no particular problem in obtaining sufficient sulphur in the mineral feed.

I may also start with an ore having an iron oxide sulphur compound suitable for use in the production of sulphuric acid. Following known processes of producing sulphuric acid, the sulphur may be removed from the iron in whole or in part. When I desire an iron oxide free of sulphur, all of the sulphur is removed. However, if for feed purposes a compound of sulphur and iron oxide is desired, then the sulphur removing reaction is discontinued at the proper stage.

In the material produced by any of the foregoing methods or processes the sulphur remaining in the material is in various forms. Thus there is some sulphur as such, and some sulphates, sulphides, etc. The sulphur is tremendously more available for dissolution in the chemicals usually contained in the digestive tract of the animal than is the case with the free or elemental sulphur heretofore used for animal feed purposes.

The material resulting from the processes described is an iron oxide compound containing iron oxide as ferric oxide of iron, and iron oxide as ferrous oxide assuming the sulphur content has been entirely removed. When sulphur has been by design retained in the material, it is in the form of iron sulphides, iron sulphates and probably also iron sulphites. In other words, it is a complex admixture of iron oxide and iron sulphate and sulphide compounds.

From the foregoing description of the methods of producing my improved mineral feeds for animals it will be understood that the sulphur, in whole or in part, is driven out, at temperatures above red heat, almost with explosive force. The result is that there remain in the material myriads of interstices, being the spaces formerly mainly occupied by the sulphur which was contained or embedded in the original unburned, unroasted or unheated mass. In other words, a substantially porous material is formed. Hence there is exposed a tremendous superficial area for attack by the hydrochloric acid or other chemical constituents present in the digestive tract of an animal.

The material produced in the manner above described is to some extent, from small amounts up to five and even ten per cent, water soluble, the water soluble content being mainly mixtures of various sulphates which are easily assimilated by the animal.

Tests show that when my improved material is subjected to a dilute hydrochloric acid (2%) at room temperature for three hours, it is many times as soluble as is ground iron oxide ore, of the type heretofore used when subjected to the same test. This test is used because a dilute hydrochloric acid is present in the digestive tract of animals for which such material is intended and the food usually remains in the digestive tract for about three hours.

As is also evident from the foregoing description, in the production of my improved mineral feed there may result, as by-products, metals of various kinds, depending upon the particular ore. The burned sulphur may also be united with oxygen and water molecules to form sulphuric acid in known manner. Hence the cost of my improved mineral feed for animals is low and because it is so much more soluble than material heretofore used for this purpose, greatly reduced quantities are adequate to supply the animal with iron or iron and sulphur compounds as desired.

While I have described specific methods of producing mineral animal feeds and certain specific resulting products or materials, I do not wish to be limited thereto except as may be necessary by limitations in the hereunto attached claims.

I claim as my invention:

1. The method of preparing a mineral feed for animals which consists in providing a crushed iron pyrite, roasting the material to drive out part of the sulphur and to leave a predetermined percentage therein and thereby providing a relative porous crushed iron-sulphur material of greatly increased solubility in the chemicals present in the digestive tract of animals.

2. The method of preparing a mineral feed for animals which consists in providing a broken mass of ferriferous material containing from 5 to 40% sulphur and a higher percentage of iron, subjecting the material to a calcining operation for driving sulphur from the material and discontinuing the calcining operation when the desired iron-sulphur percentage relationship is obtained.

3. The method of producing a mineral feed for animals which consists in crushing iron pyrite, and then heating under controlled conditions partially to remove the sulphur compounds, thereby producing a somewhat porous material comprising mainly an iron bearing compound and a smaller predetermined percentage of sulphur compounds.

4. An animal feed including, as an ingredient thereof, an iron bearing mineral having a relatively porous structure formed by the removal of sulphur initially present in said mineral.

5. An animal feed including, as an ingredient thereof, a relatively porous iron sulphur mineral obtained by heat removal of part of the sulphur content from an iron sulphur bearing material.

GEORGE B. SMITH.

REFERENCES CITED

The following references are of record in the file of this patent:

UNITED STATES PATENTS

| Number | Name | Date |
|---|---|---|
| 309,502 | Wylam | Dec. 16, 1884 |
| 866,499 | Meusel | Sept. 17, 1907 |
| 1,229,317 | Owens | June 12, 1917 |

FOREIGN PATENTS

| Number | Country | Date |
|---|---|---|
| 398,167 | Great Britain | 1933 |
| 539,298 | Great Britain | 1941 |